March 12, 1940.   E. DANNER   2,193,393
HEAT INSULATING GLASS
Original Filed Aug. 17, 1936    2 Sheets-Sheet 1

Inventor
Edward Danner
By
Attorney

March 12, 1940.  E. DANNER  2,193,393

HEAT INSULATING GLASS

Original Filed Aug. 17, 1936   2 Sheets-Sheet 2

Inventor
Edward Danner
By Faust F. Crampton
Attorney

Patented Mar. 12, 1940

2,193,393

UNITED STATES PATENT OFFICE 2,193,393

HEAT INSULATING GLASS

Edward Danner, Newark, Ohio

Substitute for abandoned application Serial No. 96,374, August 17, 1936. This application October 5, 1937, Serial No. 167,390

5 Claims. (Cl. 20—56.5)

My invention has for its object to provide durable and efficient heat insulating glass that may be readily formed and manufactured at a low cost. The invention particularly provides a heat insulating glass formed of a pair of glass plates spaced from each other by a glass strand welded or fused to the opposed marginal portions of the plates and so constructed and formed as to prevent spawling or separation of the strand or parts thereof from the plates.

The invention may be contained in glass insulating structures of different forms and used for a variety of purposes. An insulating glass structure selected as an example of the different structures that embody the invention is described hereinafter and is shown in the accompanying drawings.

This application is a substitute for Serial No. 96,374 filed August 17, 1936.

Figure 1:
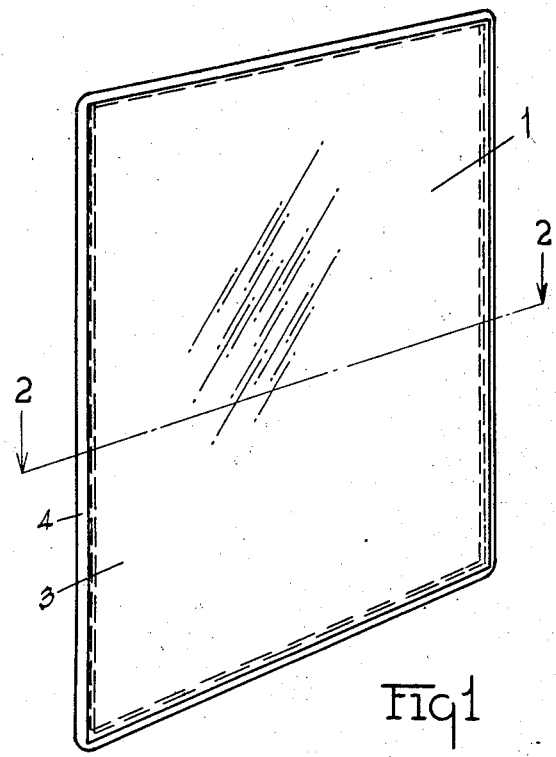
Figure 2:
Figure 3:
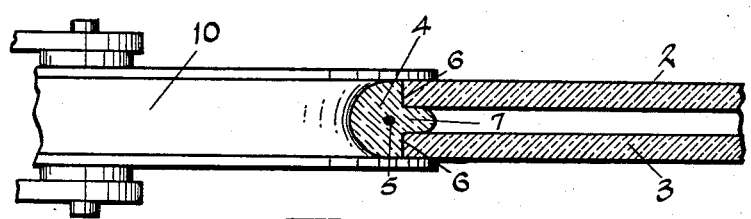
Figure 4:
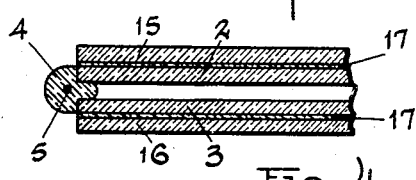
Figure 5:
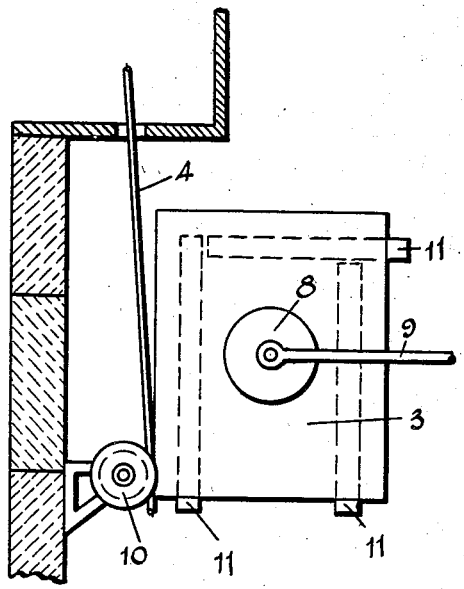
Figure 6:
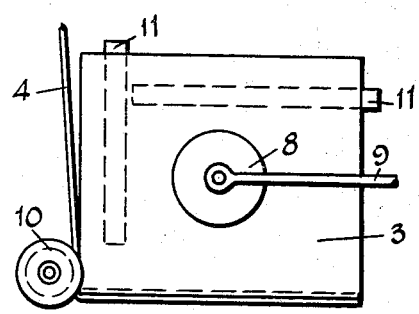
Figure 7:
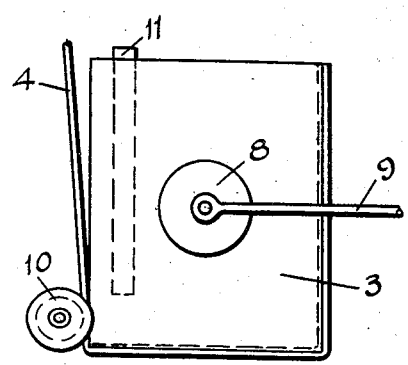

Fig. 1 is a perspective view of the insulating glass. Fig. 2 is a view of a section taken on the plane of the line 2—2 indicated in Fig. 1. Fig. 3 illustrates an enlarged section of the insulating glass. Fig. 4 illustrates a section of a "shatter-proof" insulating glass. Figs. 5, 6, and 7 illustrate steps in a process that may be used to form insulating glass. Fig. 5 illustrates the initial application of the strand to the plates. Fig. 6 illustrates the continuous application of the strand to edge parts of the sheets of glass during rotative and longitudinal movement of the sheets. Fig. 7 illustrates a succeeding step in the method.

In the form of insulating glass 1 shown in Figs. 1 to 3, a pair of sheet glass parts 2 and 3 are marginally welded to a wire reinforced glass strand 4. The glass 4 of the strand is heated until it is quite completely fused and pliable and adherable to hot glass. The glass plates 2 and 3 are heated to a temperature at which the glass will weldingly adhere to fused glass but will not deform. The strand is applied to the opposed marginal portions of the spaced parallel plates while the glass of the strand is in a molten or fused condition and the sheet glass is at a temperature that will produce integration and welding of the sheet glass parts with the glass of the strand. The strand of fused glass is pressed against the edge portions of the sheet glass parts to disposed portions of the glass of the strand in contact with the surfaces 6 of the edges of the sheets and also portions 7 intermediate the marginal portions of the glass parts and in contact with the lateral surface glass of the marginal portions of the sheets. Preferably, the wire 5 of the fused glass strand will be located in a plane midway between the sheet glass parts and exterior of the planes of the edges thereof. The outer portion of the glass of the strand is preferably shaped to form a semi-cylindrical protective marginal part of the welded glass parts.

Thus, the sheet glass parts are glass-welded in spaced relation by the strand and the space intermediate the sheet glass parts is sealed as against the entrance of any dust. Also, by reason of the air space that is thus formed, the sheet glass parts reduce the heat conductivity through the structure.

The wire 5 being exterior to the edges of the sheet glass part, operates to reinforce the edge portion of the insulating plate thus produced and prevents spawling of the glass of the strand and separation of parts of the strand from the edges of the glass to which it is welded. The wire 5 tends to exert compressional forces through the glass strand on the sheet glass parts, which forces act to maintain the sheet glass parts in assembled relation. The aforesaid compressional forces, also, tend to urge the glass strand into sealing relation with the sheet glass parts.

Fused glass on the wire is preferably progressively applied to the marginal portions of the heated sheet glass parts. The glass plates are supported in spaced relation by any suitable means, such as by the discs 8 that clamp the sheet glass parts against the spacing bars 11 formed of refractory or non-combustible material. The discs 8 are rotatably supported on the arms 9. The strand is initially welded at one point and preferably near one corner of the parallel disposed plates of glass and sequential portions of the strands are pressed against contiguous portions of the edges of the spaced sheet glass parts. Preferably, the sheet glass parts are moved edgewise to press sequential portions of the strand against the roller and thus press the portions of the strand against contiguous parts of the sheet glass.

The strips 11 may be removed as the application of the strand progresses. The strand, when slightly cool, will operate to maintain the spaced relation along those parts from which the spacing strips 11 are removed. Thus, the plate is progressively drawn over the roller and rotated until the edges of the plate are covered and sealed.

If desired, the outer glass plates 2 and 3 may be covered with a suitable plastic cellulosic material in the manner well known in the art and additional sheet glass parts 15 and 16 may be applied thereto to produce a non-shatterable, heat insulating glass, such as shown in Fig. 4.

I claim:

1. Heat insulating glass comprising wire reenforced glass strands; sheet glass parts marginally fused to and spaced by the glass strand parts; the glass strand parts having portions located intermediate and fused to the side surfaces of the marginal edge portions of the sheet glass parts and other portions disposed on and extending along the edge surfaces of the glass parts and exterior to the marginal edge portions of the sheet glass parts and fused to the said edge surfaces.

2. Heat insulating glass comprising wire reenforced glass strands; sheet glass parts marginally fused to and spaced by the glass strand parts; the glass strand parts having portions located intermediate and fused to side surfaces of the marginal edge portions of the sheet glass parts and other portions disposed on and along the edge surfaces of the glass parts and exterior to the marginal edge portions of the sheet glass parts and fused to the said edge surfaces; the wire of the reenforced glass strand parts disposed exterior to the plane of the edges of the sheet glass parts.

3. Heat insulating glass comprising wire reenforced glass strands; sheet glass parts marginally fused to and spaced by the glass strand parts; the glass strand parts having portions located intermediate and fused to side surfaces of the marginal edge portions of the sheet glass parts and other portions having rounded surfaces and disposed on and along the edge surfaces of the glass parts and exterior to the marginal edge portions of the sheet glass parts and fused to the said edge surfaces; the wire of the reenforced glass strand parts disposed exterior to the plane of the edges of the sheet glass parts.

4. Heat insulating glass comprising a pair of sheet glass parts; a glass strip having a metal wire extending along and within the glass strip and fused to the strip, the glass strip located intermediate the proximate side marginal surfaces of the sheet glass parts and extending throughout the total length of the said marginal surfaces and fused thereto.

5. Heat insulating glass comprising a pair of sheet glass parts; a glass strip having a metal wire extending along and within the glass strip and fused to the strip, the glass strip located intermediate the proximate side marginal surfaces of the sheet glass parts and fused thereto; the wire disposed exterior to the plane of the edges of the sheet glass.

EDWARD DANNER.